SEQUENTIAL RETRIEVAL CONTROL FOR A SELF-SEARCHING MEMORY
Filed Nov. 9, 1961 6 Sheets-Sheet 1
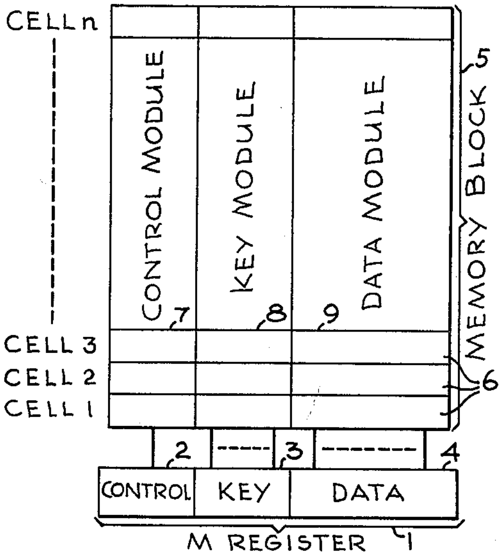
FIG. 1
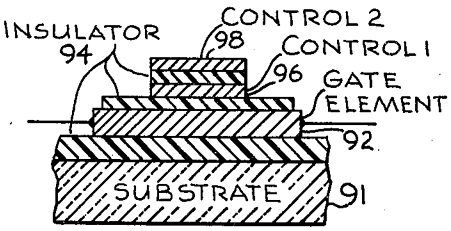
FIG. 2
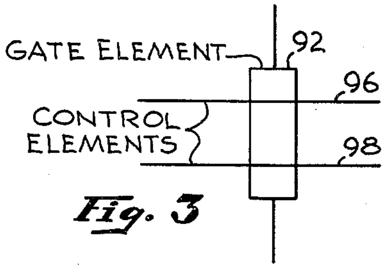
FIG. 3
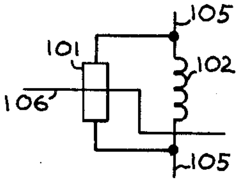
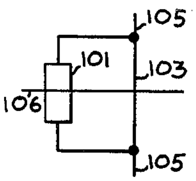
FIG. 4(a) FIG. 4(b)
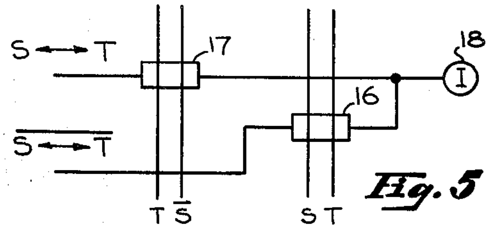
FIG. 5
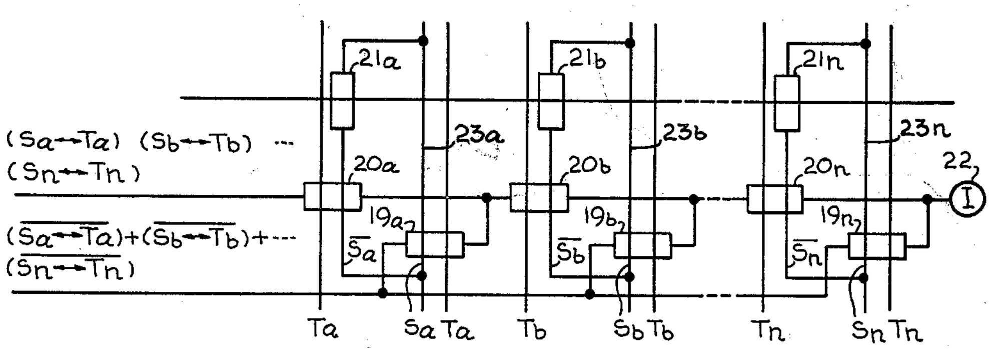
FIG. 6
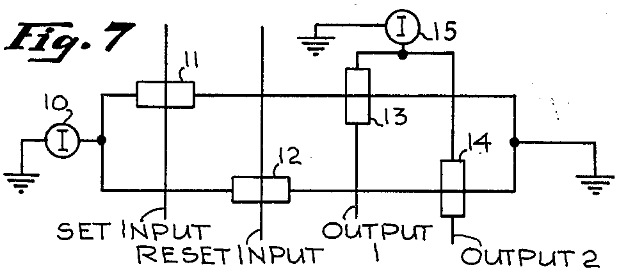
FIG. 7
PAUL M. DAVIES
INVENTOR.
BY Fraser and Bogucki
ATTORNEYS
George C. Thompson
AGENT PAUL M. DAVIES
INVENTOR.
BY Fraser and Bogucki
ATTORNEYS
George C. Thompson
AGENT

PAUL M. DAVIES
INVENTOR.

BY Fraser and Bogucki
ATTORNEYS
George C. Thompson Jr.
AGENT

SEQUENTIAL RETRIEVAL CONTROL FOR A SELF-SEARCHING MEMORY

Filed Nov. 9, 1961

6 Sheets-Sheet 4

INVENTOR.
PAUL M. DAVIES
BY Fraser and Bogucki
ATTORNEYS
George C. Thompson
AGENT

SEQUENTIAL RETRIEVAL CONTROL FOR A SELF-SEARCHING MEMORY

Filed Nov. 9, 1961 6 Sheets-Sheet 5

PAUL M. DAVIES
INVENTOR.
BY Fraser and Bogucki
ATTORNEYS
George C. Thompson Jr.
AGENT July 20, 1965 P. M. DAVIES 3,196,409

SEQUENTIAL RETRIEVAL CONTROL FOR A SELF-SEARCHING MEMORY

Filed Nov. 9, 1961 6 Sheets-Sheet 6

INVENTOR.
PAUL M. DAVIES
BY Fraser and Bogucki
ATTORNEYS
George C. Thompson, Jr.
AGENT 3,196,409

SEQUENTIAL RETRIEVAL CONTROL FOR A SELF-SEARCHING MEMORY

Paul M. Davies, Manhattan Beach, Calif., assignor, by mesne assignments, to Thompson Ramo Wooldridge Inc., Redondo Beach, Calif., a corporation of Delaware Filed Nov. 9, 1961, Ser. No. 151,326
6 Claims. (Cl. 340—173.1)

This invention relates to an information storage system and more particularly to a self-searching storage system in which a plurality of information items may be retrieved in response to a non-unique identification key.

Information storage systems are well-known in connection with electronic computers, data processing systems and the like. Such systems, or more accurately the particular portions thereof in which information storage is effected, are commonly referred to as memories in view of a property they share with the human mind in being able to store representations of particular applied information and to provide signals indicative of particular information upon request. Such memories may be broadly considered to be of two types: those in which information is stored in particular locations within the memory on either a random or an ordered basis and is retrieved by comparing each item stored in the memory with an identification key which is representative of the information that is sought, and those memories in which the storage section is divided into a number of discrete portions each of which bears an address that is used to locate a stored information item upon request. In most memories of the first type mentioned, information searching proceeds on a sequential basis so that on the average there are required half as many comparison operations as there are cells in the memory, thus rendering the retrieval operation both expensive and time consuming. Memory systems of the second general type eliminate the requirement that the entire memory be searched for a particular information item by the use of the memory section address which identifies the particular section of the memory in which an information item is stored. Thus all that is required is a search of the particular section identified by the address. However additional equipment is required in order to store and process the memory section addresses which are associated with the stored information items.

Information storage systems which present the advantages of both of the above mentioned systems without their inherent disadvantages are disclosed in my copending applications entitled, "Self-Searching Memory," Serial No. 76,368, filed December 16, 1960, now abandoned, and "Improvements in Self-Searching Memory Systems," Serial No. 110,098, filed May 15, 1961. These systems belong within the first mentioned general class but attain a searching speed comparable with that of the second class by providing for a simultaneous comparison of a particular information item identification key with all of the information items stored within the memory. However it is a requirement of the systems disclosed in the above identified copending applications that the identification key be unique with respect to a particular information item.

Accordingly, it is a general object of this invention to provide for the retrieval of a plurality of stored information items from a memory by the application of a single identification key related to each of the stored items.

It is a further object of this invention to provide for the retrieval of a plurality of stored information items identified by a non-unique identification key in a predetermined sequence.

In accordance with the above mentioned objects, it is a specific object of the invention to provide a signal indication when the plurality of stored information items corresponding to the non-unique identification key has been read out of the memory.

It is an additional object of the invention to provide for the retrieval of selected information from a memory in a predetermined sequence upon the application of non-unique selecting signals without the necessity for searching portions of the memory containing unselected information.

In general the present invention provides a sequential control circuit for a self-searching memory which establishes a particular order for the retrieval of selected information from a memory. The information which is sought, identified by a selected identification key which may be common to a plurality of stored information items, is read out in sequence in the order specified by the control circuit. Thus, additional versatility is provided for a self-searching memory by virtue of which a plurality of stored information items may be read out without the necessity for the presentation of a corresponding plurality of unique item identification keys. At the same time, however, individual information items may be read out in response to the application of a corresponding unique key for each.

In one specific arrangement of the invention, a memory system employing separate key identification and data storage sections in each individual memory cell is controlled for sequential readout in a predetermined order of stored information which corresponds to key information applied to the key identification section. In another specific arrangement of the invention, sequential readout in similar fashion is provided in a memory system having a common key identification and data storage section.

A better understanding of the invention may be gained from a consideration of the following detailed description, taken in conjunction with the accompanying drawings, in which:

FIG. 1 is a block diagram of one particular information storage system including the present invention;

FIG. 2 is a cross-sectional view of a superconductor control element employed in the present invention;

FIG. 3 is a schematic representation of the symbol used herein to designate the superconductor element of FIG. 2;

Figure 9:
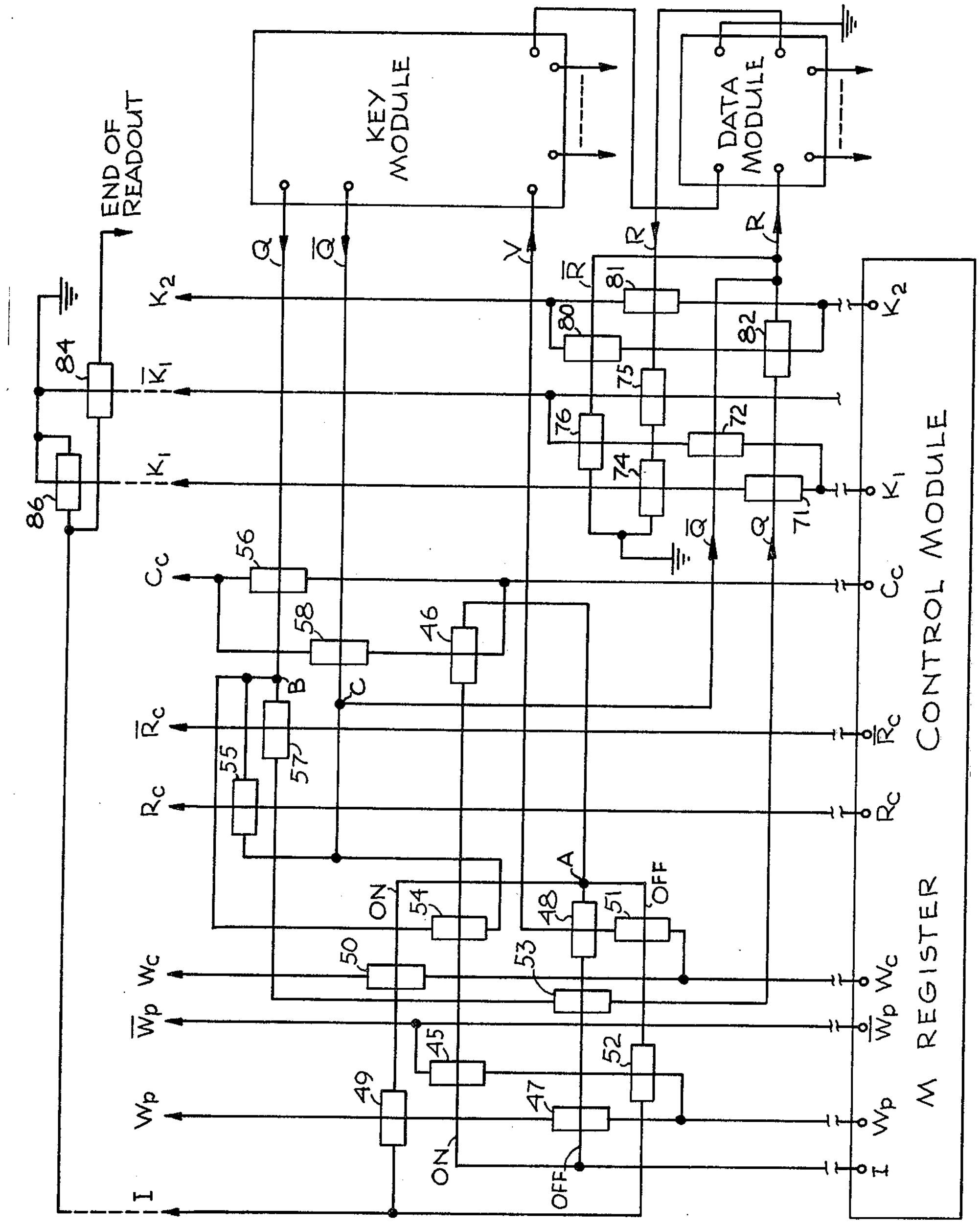
Figure 8:
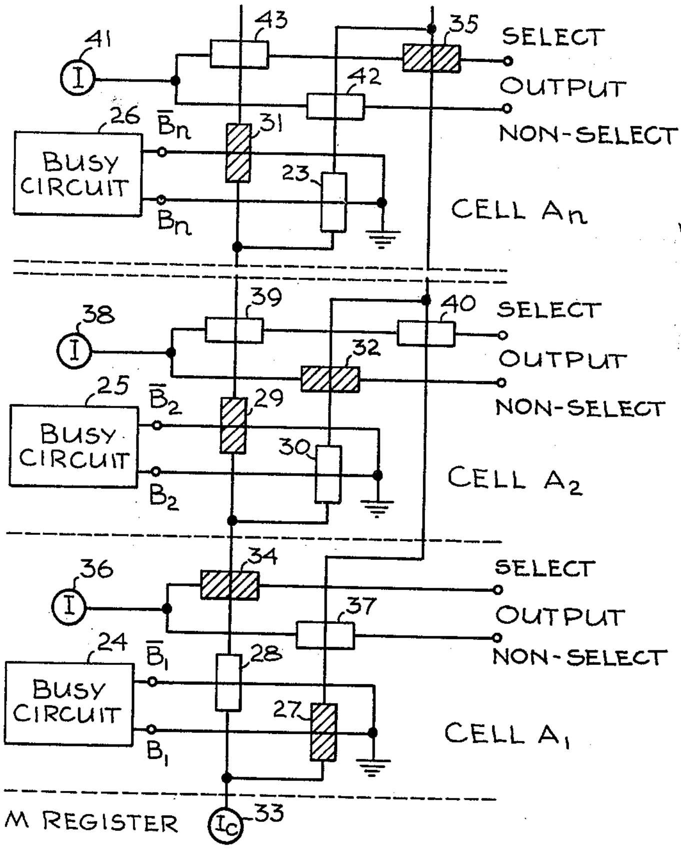
Figure 11:
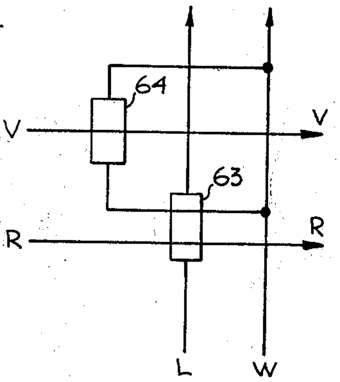
Figure 13:
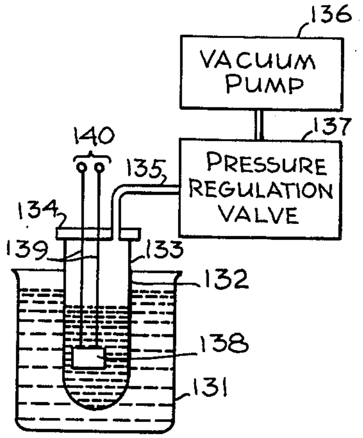
Figure 10:
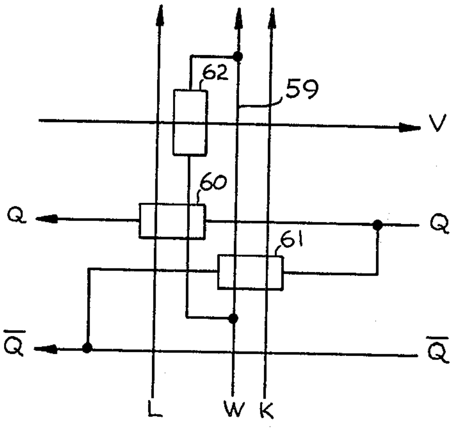
Figure 12:
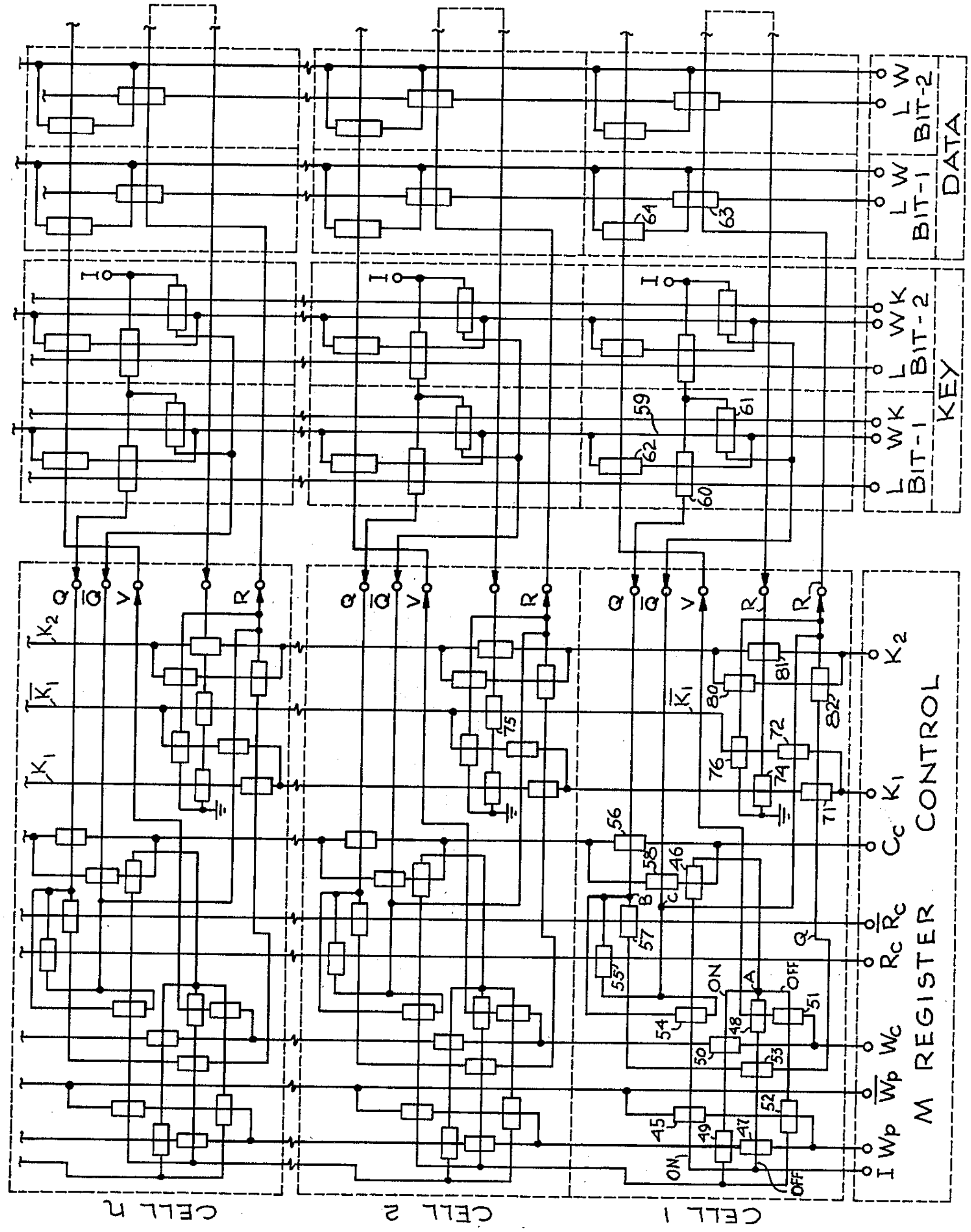
Figure 14:
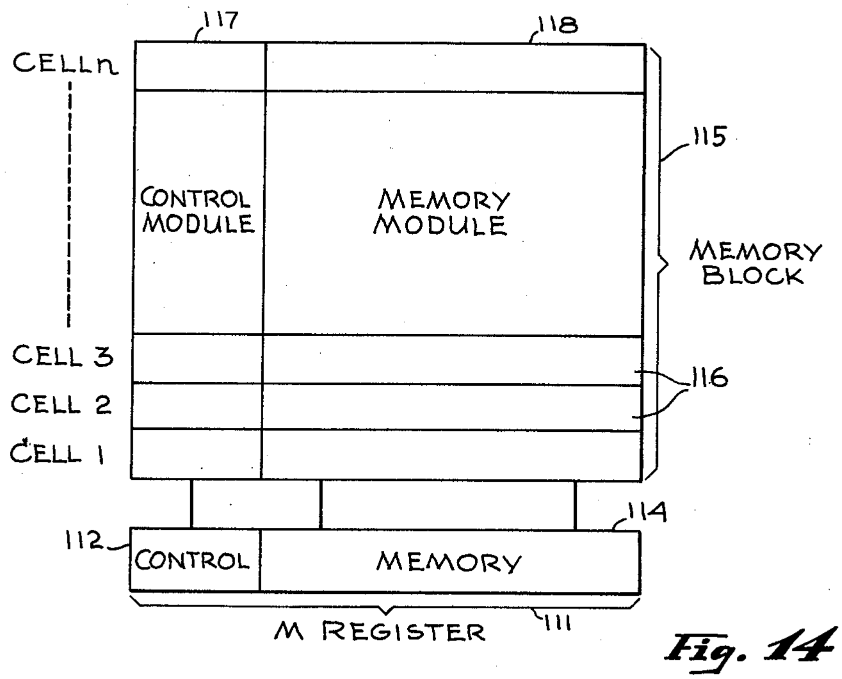
Figure 16:
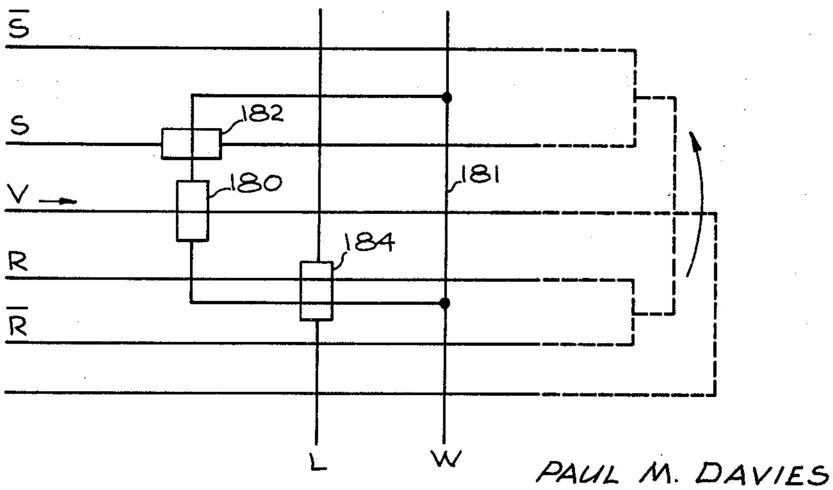
Figure 15:
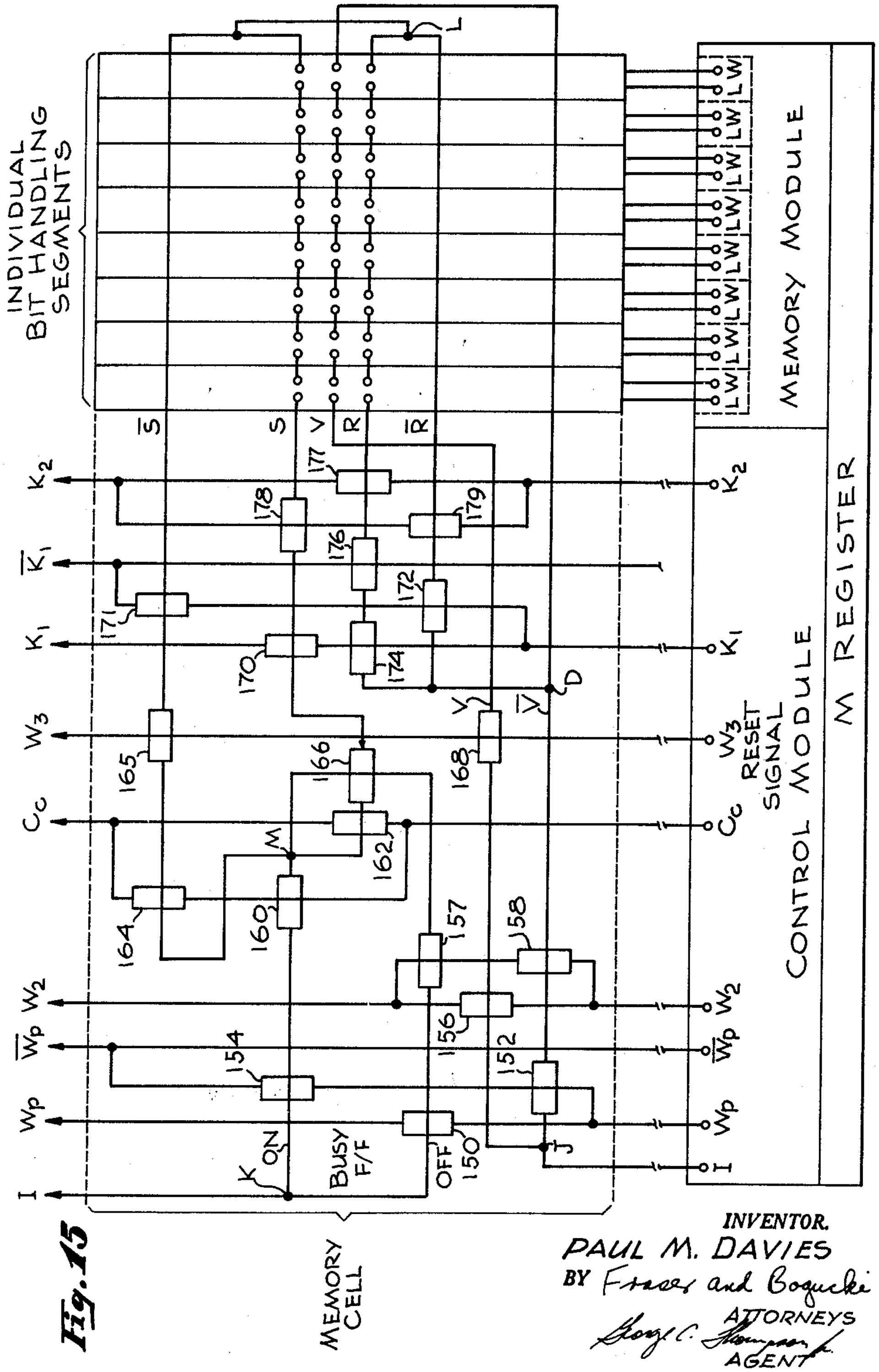

FIGS. 4(*a*) and 4(*b*) are schematic representations of a particular superconductor storage device employed in the invention;

FIG. 5 is a schematic representation of a simplified comparison circuit included for the purpose of explaining the operation of the circuit of FIG. 6;

FIG. 6 is a schematic representation of a portion of the information storage system of FIG. 1;

FIG. 7 is a simplified schematic diagram of a flip-flop circuit which may be employed in the information storage system of FIG. 1;

FIG. 8 is a schematic representation of a storage cell selection circuit which may be employed in the information storage sysetm of FIG. 1;

FIG. 9 is a schematic representation of the control circuit for the information storage system of FIG. 1 including one particular arrangement of the invention;

FIG. 10 is a schematic representation of a single digit comparison circuit which is representative of a portion of the information storage system of FIG. 1;

FIG. 11 is a schematic representation of a single digit storage circuit representative of a portion of the information storage system of FIG. 1;

FIG. 12 is a schematic representation of a system in accordance with the invention as shown in FIG. 1;

FIG. 13 is a diagrammatic representation of one suitable apparatus which may be employed for maintaining superconductive structures employed in the practice of the invention at a proper temperature of operation;

FIG. 14 is a block diagram of a second particular arrangement of the invention;

FIG. 15 is a schematic representation of a control circuit of the arrangement of FIG. 14; and FIG. 16 is a schematic representation of a storage and comparison circuit of FIG. 14.

To present a better understanding of the invention, a block diagram will first be shown representative of a particular memory system employing the invention. Referring now to FIG. 1, there is shown a memory block 5 employed in conjunction with the present invention. The memory block 5 comprises a plurality of individual cells, such as the cells 6, each having the capacity to store a complete record or individual information item. Each memory cell 6 is divided into three parts identified as a control module 7, a key module 8, and a data module 9. The data module 9 is the portion of the memory cell 6 within which the information record is actually stored. The key module 8 is the portion of the memory cell 6 containing circuitry for establishing a comparison between an applied identification key and a second identification key stored as part of the record of the particular memory cell 6. The control module 7 includes circuitry for providing the desired control of the associated portions of the memory cell 6 including the steps of writing information, reading out information, indicating whether a particular cell 6 is empty or filled, controlling the sequence with which a cell is called upon to read out its stored information, and the like. Cooperating with the memory block 5 is a single M register 1 for communicating with and controlling the individual modules of the memory cells 6. As with the individual memory cells 6, the M register 1 is divided into a control module 2, a key module 3, and a data module 4. Each of the control, key and data modules of the M register 1 is connected to corresponding control, key and data modules in the individual memory cells 6 of the memory block 5. In storing information within the memory block 5, the information record together with a corresponding key unique thereto is applied to the data module 4 and the key module 3 respectively of the M register 1.

In a manner which will be described in further detail below, signals from the control module 2 may operate to select the first available empty memory cells 6 within the memory block 5. The information record together with its associated identification key is thereafter transferred to the data module 9 and key module 8 of the selected memory cell 6 from the data module 4 and key module 3 of the M register 1. As information is stored within a selected memory cell 6, the control module 7 thereof is caused to assume a state indicating that the particular memory cell 6 is now occupied. A resulting indication of the state of the memory cell is employed in the selection of the first available memory cell during the writing process. Readout of information from a particular cell is effected by storing the key identifying the information which is sought in the key module 3 of the M register 1. The control module 2 of the M register 1 is caused to generate a readout command signal which, together with the key now located in the key module 3 of M register 1, is sent to all memory cells 6 in the memory block 5. The key information located in the key module 3 of the M register 1 is transmitted to all memory cells 6 simultaneously and compared with the key information stored therein. Depending upon whether the key information inserted in key module 3 of M register 1 is unique to a particular stored information record or identifies a plurality of stored information records, one or more of the stored information records may be selected to be read out. In accordance with the present invention, particular circuitry included in the control modules 7 of the respective memory cells 6 automatically establishes a sequence for the readout of those memory cells 6 containing information selected by the applied identification key from the key module 3 of the M register 1.

The memory system described herein possessses the capability of operating in response to masked key information. For example, portions of the key information which are masked will be ignored when being compared with portions of the key information contained in the key modules 8 of the individual memory cells 6. Thus a particular identification key which is unique to an individual stored information record may be rendered non-unique and utilized in the selection of a plurality of stored information items of a class containing the uniquely identified information item simply by masking certain portions of the unique identification key. Furthermore, information may be cleared from those memory cells 6 containing information corresponding to a particular identification key contained in the key module 3 of the M register 1 simply by the application of a selective control signal from the control module 2 to change the state of the indicating device for this purpose contained within the individual control modules 7 of the memory cells 6.

It will be seen that the present invention may be employed to advantage in various situations. For example, in connection with the storage of records for a motor vehicle registration office, the individual records may be uniquely defined in terms of license plate number, engine number, body number, or name and address of owner; or they may be non-uniquely defined in terms of a portion only of a license plate number, the model and color of an automobile, or the like.

The invention will be described in terms of apparatus and circuitry comprising superconductive elements arranged for storage and control. Such elements are particularly suitable for use in the arrangements of the invention in view of their extremely small size and low power requirements and the high speed with which they may be switched between different storage states.

Before proceeding directly with the description of the remaining figures of the drawings, it may be well to briefly review the principles of operation of superconductive devices in order that the invention may be better understood. In the investigation of the electrical properties of materials at very low temperatures, it has been found that the electrical resistivity of certain materials experiences a discontinuity as the temperature of the material approaches absolute zero (0° Kelvin). In fact, for the materials employed in the devices described in the practice of the instant invention, the electrical resistivity becomes equal to zero below some critical temperature. Such materials have come to be known as superconductors, and the temperature at which the discontinuity in the resistivity curve occurs is known as the transition temperature. Recent developments have made it relatively simple to maintain electrical circuits including superconductive materials below the transition temperatures thereof so that the practical application of superconductive devices in electrical circuits becomes feasible. The peculiar property of superconductors, namely, that the resistance is zero in the superconducting temperature region, makes it possible for individual superconductive devices to be interconnected to perform logical functions in data processing systems and digital computers. Furthermore, since the devices may be fabricated of extremely thin material layers of the order of a few hundred Angstrom units in thickness, it can be seen that an individual device may be of very small size. In addition, since the device is operated principally in its region of superconductivity, current flowing therein when the element is superconductive dissipates no power. Accordingly, superconductive devices become extremely attractive for use in a complex system, such as a digital computer, wherein extensive circuits involving the interconnection of a large number of such devices may be operated with extremely low power requirements.

It has been found that the transition point, i.e., the point at which a given material changes between superconductive and normally resistive states, is a function of both temperature and applied magnetic field with the transition temperature changing as the applied magnetic field is varied. With a magnetic field applied, the temperature at which superconductivity begins for a given material is lowered, and furthermore this temperature decreases as the intensity of the magnetic field is increased. Therefore it can be seen that a superconductive material may be switched in and out of its superconducting region by maintaining the temperature thereof slightly below the zero magnetic field transition temperature and by varying the applied magnetic field above and below some threshold value applicable for that temperature. This phenomenon suggests that the presence of a current existing in a superconductor may be detected by the application of a particular magnetic field above the threshold value for the temperature at which the superconductor is maintained in order that current flowing therein may produce a voltage drop that can be observed. Thus superconductive devices may be employed to perform a variety of functions required for computer operation, as for example information storage, circuit current control, and the like.

It should be noted that the flow of electric current within a superconductor itself generates a magnetic field which, when combined with any externally applied magnetic field, determines whether the threshold field value is exceeded. It will be appreciated that the magnetic field arising from the flow of current in one superconductor may be applied to a second superconductor to exceed the threshold field value thereof and thereby cause the second superconductor to switch from the superconductive region to a region of normal electrical resistance. Thus it will be clear that one superconductor device carrying a current of a value sufficient to generate a magnetic field exceeding the threshold value of a second device may be employed to control the resistive state of the second superconductive device.

For the purposes of the present application, the term "superconductive material" will be understood to mean a material which loses all measurable resistance to the flow of electrical current for temperatures below some specified value of critical temperature. A few of these materials and the corresponding transition temperature at which each material changes from a normally resistive state to a superconductive state are listed below:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.3 |
| Thallium | 2.4 |
| Aluminum | 1.2 |
| Titanium | 0.5 |

In addition to the materials listed above, other elements as well as many alloys and compounds have been found to exhibit superconductive properties at temperatures ranging between 0° and 17° Kelvin. For a more complete discussion of this subject, reference is made to a book entitled "Superconductivity" by D. Schoenberg, Cambridge University Press, Cambridge, England (1952). The above listed transition temperatures apply only when the materials are in a substantially zero magnetic field. In the presence of a magnetic field, the transition temperature is decreased so that a given material may be in an electrically resistive state even for temperatures below the specified transition temperature at which the material would be superconductive in the absence of a magnetic field.

Inasmuch as a magnetic field may arise from a current flowing in a superconducting material itself, the material may be considered to have a critical value of electrical current as well as a critical value of magnetic field which will cause the material to switch from a condition of superconductivity to an electrically resistive condition. Accordingly, when a material is held at a temperature below the normal transition temperature for a zero magnetic field, the superconducting condition of the material may be extinguished by the application of a magnetic field which may originate from an external source or may be internally generated through the flow of current in the material itself.

A number of the superconductive devices and circuits employed in the practice of the present invention will now be described. In FIG. 2 there is depicted a subtrate layer 91 which may be of glass or some other material suitable as a base, to which are affixed a number of gate and control elements comprising a dual control superconductive device. The gate element 92 is electrically isolated by virtue of being enveloped by insulating layers 94 and the control elements 96 and 98 are likewise electrically isolated by insulating layers 94. In FIG. 2 two control elements 96 and 98 are shown in a substantially transverse direction with respect to the direction of current applied to the gate element 92. Both the first and second control elements 96, 98 are placed in the same plane and are made as identical to each other as possible. When the currents in both control elements 96, 98 are in the same direction, the magnetic fields are additive and thereby switch the gate element 92 from a superconductive state to a resistive state. The current levels in either of the control elements 96, 98 may be chosen so that either control element can switch the gate element or alternatively, as in the example just described, the magnetic fields of both elements may be required to combine in order to switch the gate element 92.

The sectional view depicted in FIG. 2 is shown substantially enlarged for purposes of illustration only, and it is not intended that the dimensions of the respective elements shown relate proportionally to the dimensions of actual working embodiments. It should be understood that the magnetic fields developed by current in the respective elements are necessarily relatively weak. Consequently an operable device is obtainable by establishing a structure made up of extremely thin films. It has been established experimentally that thin films having a thickness of from 3 to $8 \times 10^{-5}$ centimeters can be made to switch between regions of superconductivity and normal resistivity in approximately $20 \times 10^{-9}$ seconds under normal operating currents. The individual elements may be of the order of $10^{-2}$ centimeters in width and a fraction of a centimeter in length.

FIG. 3 depicts a schematic symbol corresponding to the structure of FIG. 2. Control elements 96 and 98 are shown crossing the gate element 92 and at substantially right angles thereto. Because of the described structural configuration, the effect upon the gate element 92 of current in either of the control elements 96, 98 is substantially identical.

FIG. 4(*a*) depicts a particular cryogenic circuit known in the art and utilized for the purpose of storing an individual bit of information. The circuit of FIG. 4(*a*) is known as a persistor of the gated type and comprises a pair of superconductive devices 101 and 102 having different values of critical current or transition temperature. In the most common arrangement of the persistor, the device 101 has the lower critical current value and is therefore thought of as the resistive element. In operation, the device 102 is usually maintained within the superconductive region below the value of critical current so that the effect of the device 102 in the circuit is that of an inductance. Information is stored within a persistor by the establishment of a circulating current within the persistor loop comprising the devices 101 and 102. The state of the stored information corresponds to the direction of the circulating current within the persistor which may be controlled in numerous ways known in the art. In the practice of the present invention, a given persistor is selected for writing into by a current flowing in the lead 106 and a current is established within the circuit loop comprising the devices 101 and 102 by applying current in a selected direction to the leads 105. Current in the lead 106 renders the device 101 resistive so that the current applied to the leads 105, which may be considered a writing current, builds up within the inductive portion 102. Thereafter upon the termination of the selecting current on the lead 106 and the applied writing current on the leads 105, the inductive portion 102 maintains a current through the now superconductive device 101 in a direction determined by the writing current. Thus, for example, if the writing current applied to the leads 105 proceeded in an upward direction, the resulting circulating current in the persistor of FIG. 4(*a*) flows in a counterclockwise direction. If the writing current of the leads 105 is in the opposite direction, the resulting circulating current is in a clockwise direction. Unless affected by outside influences, the stored circulating current may be maintained indefinitely, since the persistor circuit is superconductive and exhibits zero resistance.

For convenience the gated persistor circuit of FIG. 4(*a*) will be represented hereinafter as shown in FIG. 4(*b*). In the latter figure the inductance 102 is represented by a straight line 103. Where employed, it will be understood that the schematic configuration of FIG. 4(*b*) represents a gated persistor storage circuit functioning as described for FIG. 4(*a*).

In FIG. 5 there is shown a circuit employing a pair of crossed film superconductive devices such as that shown in FIG. 2 for indicating an equivalence relationship between two applied variables S and T. This equivalence relationship is expressed symbolically as S↔T and corresponds to the logical expression $ST+\overline{S}\overline{T}$. An output current is developed on the S↔T lead when both S and T receive equivalent signals. The circuit of FIG. 5 is shown comprising two dual control devices 16 and 17 controlled by the currents in the two control elements associated with each device. The geometry of the two control elements is such that the associated gate element is switched resistive if the control currents in the control elements are in the same direction and conversely the gate element remains superconductive if the control currents are in opposite directions. In the example chosen, device 16 is controlled by leads designated S and T, whereas device 17 is controlled by leads designated $\overline{S}$ and T. The information is identified by means of the direction of current on any lead. For example, a binary 1 on both the S and T leads may be represented by current flowing in an upward direction along the leads whereas a binary 0 may be represented by current flowing in a downward direction. $\overline{S}$ is the conventional symbolism used to indicate "not S"; in other words the current in the $\overline{S}$ lead is always opposite to the direction of current in the S lead. Therefore it will be understood in the circuit of FIG. 5 the device 16 is resistive and the device 17 superconductive if leads S and T both have a binary 1 or both have a binary 0 applied. On the other hand, gate 17 is resistive and device 16 superconductive of the S lead has a binary 1 and the T lead has a binary 0, or vice versa. A current source 18 is connected to supply current which will flow either through the gate element of the device 17 and along the S↔T lead to indicate the existence of an equivalent input signal condition or through the gate element of the device 16 and along the $\overline{S\leftrightarrow T}$ lead to indicate the absence of equivalence between the input signals.

FIG. 6 schematically represents a circuit including a number of equivalence gates of the type shown in FIG. 5 utilized in conjunction with a number of gated persistor circuits such as are shown in FIG. 4. As shown, the circuit of FIG. 5 provides complementary outputs, either the logical expression $$(S_a\leftrightarrow T_a)\ (S_b\leftrightarrow T_b)\ .\ .\ .\ (S_n\leftrightarrow T_n)$$

or the complement thereof, namely, $$\overline{(S_a\leftrightarrow T_a)}+\overline{(S_b\leftrightarrow T_b)}+\ .\ .\ .\ +\overline{(S_n\leftrightarrow T_n)}$$

The network of FIG. 6 performs a matching operation between two numbers, one of which is stored in the persistor circuits comprising the elements 21 and 23, while the other number is presented on the T leads to be compared with the numbers stored in the persistor circuits. For example, let it be assumed that a binary 1, represented by a counterclockwise circulating current, is stored in the persistor circuit comprising the elements **21*a* and 23*a*. The application of a binary 1 signal, represented by upwardly directed currents on the $T_a$ leads, produces a cancellation of the magnetic field applied to the gate element 20*a* and a simultaneous reinforcement of the magnetic field applied to the gate element 19*a*. Thus current is directed from the source 22 through the element 20*a* along the equivalence signal output lead while it is blocked from passage through the element 19*a* to the nonequivalence signal output lead. It can be seen, therefore, that an equivalence output signal is developed only if a match occurs with the applied number on the T leads in every bit stage of the comparison circuit. A mismatch in any bit stage causes a gate element of the associated device 20 to become resistive and the corresponding gate element of the associated device 19** to become superconductive so that current is diverted to the bottom lead.

The circuit of FIG. 7 represents a flip-flop circuit composed entirely of crossed film cryogenic devices. In FIG. 7 a current source 10 is shown connected to a parallel circuit comprising the gate element of a device 11 and the control element of a device 13 in one branch with the gate element of a device 12 and the control element of a device 14 in the other branch. A second current source 15 is shown connected to the gate elements of the devices 13 and 14 in parallel. The gate element of the device 13 is connected to a lead designated "output 1" while the gate element of the device 14 is connected to a lead designated "output 2." "Set" and "reset" inputs are shown applied to the control elements of the devices 11 and 12 respectively. In considering the operation of the circuit of FIG. 7, a signal identified as "set input" is applied to the control element of the device 11 for switching the gate element of the device 11 from a superconductive to a resistive state. Current from the current source 10 is then directed to the superconductive path consisting of the gate element of the device 12 and the control element of the device 14. As a result the gate element of the device 14 is switched into a resistive state while the gate element of the device 13, being in a superconductive state, permits current from the current source 15 to supply the "output 1" lead.

It should be understood that once current is established in a particular superconductive path, it remains flowing in this path even though the signals which initially establish the direction of current flow may be removed. Thus the "set input" signal need not be a continuous current but may be in the form of a short pulse. Thereafter current from the current source 10 remains flowing along the lower path until a signal is applied on the "reset input" lead to cause the gate element of the device 12 to become resistive and switch the current from the lower path to the upper path comprising the gate element of the device 11 and the control element of the device 13. When this occurs, the current from the source 15 is switched from the "output 1" lead to the "output 2" lead as a result of the gate element of the device 13 becoming resistive while the gate element of the device 14 becomes superconductive. It can be seen, therefore, that a "set input" pulse produces an "output 1" signal, whereas a "reset input" pulse produces an "output 2" signal. Because the output signal remains after the removal of the input pulse, the flip-flop circuit may be considered to exhibit memory.

FIG. 8 represents schematically a number of flip-flops illustrated in FIG. 7 and modified for use in the control modules of the memory block 5 of FIG. 1. This particular circuit is included to illustrate how control signals from the M register may seek out and identify the first available empty cell in preparation for the writing of particular information therein. In the preferred sequence employed in the practice of the invention, available memory cells closest to the M register are selected before other memory cells. This sequence is employed both in the writing of information into the memory and in the retrieval or readout of information therefrom. For purposes of illustration, three control modules representing three individual memory cells $A_1$ and $A_2$ and $A_n$ are shown. The selection of the first available cell will be explained by assuming that the memory cell $A_1$ is occupied and that the memory cells $A_2$ and $A_n$ are empty, which thereby identifies the memory cell $A_2$ as the first available empty cell. Associated with each control module shown are busy circuits 24, 25 and 26 respectively, each arranged to generate a signal on the $\overline{B}$ lead if the associated memory cell is empty, and hence available, or on the B lead if the memory cell is occupied.

Under the original assumption, therefore, the busy circuit 24 generates a signal on the $B_1$ lead which switches the device 27 to the resistive state, indicated by the cross-hatched lines therein. This leaves the gate element of the device 28 superconductive, as indicated by the lack of cross-hatching therein. Busy circuit 25 generates a signal on the $\overline{B}_2$ lead, causing the device 29 to be resistive and the device 30 to be superconductive. Similarly the busy circuit 26 causes the device 31 to be resistive and the device 23 to be superconductive. Current is supplied from a current source 33 in the M register in order to determine the identity of the first available empty cell. This current from the source 33 is applied through all of the cells in series and is selectively directed according to the condition of the elements controlled by the respective busy circuits therein. With the cell $A_1$ busy and the cell $A_2$ available, the current from the source 33 is directed through the gate element of the device 28, through the gate element of the device 30 and upwardly along the vertical lead at the right-hand side of the figure. In following this path, the current flows through the control elements of the devices 34, 32 and 35 in the cells $A_1$, $A_2$ and $A_n$ respectively, thus rendering the associated gate elements resistive. Thus it can be seen that current from the individual current sources 36, 38 and 41 in the respective cells is controlled to provide an output on the "non-select" line for cell $A_1$, an output on the "select" line for cell $A_2$ and an output on the "non-select" line for cell $A_n$. It will be noted that non-select output indications are provided for all cells more remote from the M register than the first available empty cell, whether or not such cells are in fact occupied. Thus the circuit arrangement of FIG. 6 provides an identification of one and only one empty cell as available for the storage of information in response to a current signal from the M register.

Referring now to FIG. 9, there is shown a schematic diagram illustrating the invention in the circuit of a control module as contained in each memory cell. The input leads identified as I, $W_p$, $\overline{W}_p$, $W_c$, $R_c$, $\overline{R}_c$, $C_c$, $K_1$ and $K_2$ all originate in the control module of the M register and sequentially connect all control modules of each memory cell. In addition there is shown a lead designated $\overline{K}_1$ which originates in the control module nearest the M register and passes through the remainder of the control modules. The I lead supplies a current for use with a busy flop-flop circuit and an auxiliary flip-flop circuit located in each control module, as well as a readout termination circuit which is common to all the memory cell control modules. In the operation of the circuit, current flows continuously on the I lead, but current signals are applied as pulses on the remainder of the input leads. The W input leads are energized during the writing process, the C input lead is energized for clearing one or more cells, and the R and K input leads are energized during the readout process.

In the circuit of FIG. 9, the superconductive devices 45, 46, 47 and 48 are shown connected in a circuit which will be designated the busy flip-flop. Superconductive devices 49, 50, 51 and 52 are arranged in a circuit which will be designated an auxiliary flip-flop and which is controlled by the busy flip-flop. The operation of the busy and auxiliary flip-flops is similar to that described in connection with the arrangement of FIG. 8.

During the writing process, a first available memory cell must be selected by means of the busy flip-flop of the memory cell control modules. To this end a pulse is initially applied on the $W_p$ lead which constitutes a prepare-to-write signal for seeking out and turning on the auxiliary flip-flop circuit of the first available memory cell. The $\overline{W}_p$ lead is actually an alternate path for for the current signal applied to the $W_p$ lead. Any memory cell which is available for storing information has its associated busy flip-flop in the OFF condition. Therefore, for purposes of explanation let it be assumed that the depicted busy flip-flop circuit of FIG. 9 is turned off and that this circuit corresponds to the first available memory cell. Current therefore flows along the OFF path through the control element of device 47 and the gate element of device 48 to the common point A. A current pulse on the $W_p$ lead is blocked by the gate element of the device 47 which is now in a resistive condition and therefore flows through the control element of the device 52 and the gate element of the device 45 to the $\overline{W}_p$ lead. This renders the gate element of the device 52 resistive, thus turning ON the auxiliary flip-flop. Current from the point A is thereby directed through the control element of the device 50 and the gate element of the device 49. A signal on the $W_c$ lead, which follows the $W_p$ lead signal in time sequence, is now blocked by the resistive state of the gate element of the device 50 and so is directed through the gate element of the device 51 via the control element of the device 48 to the lead designated V leading to the key and data modules of the selected memory cell. This current on the V lead provides the designation of the first available memory cell and serves as the selection current for the gated persistors in the bit stages of that cell. As the $W_c$ signal current flows through the control element of the device 48, the gate element thereof becomes resistive and thereby turns on the busy flip-flop so that current on the I lead now flows through the control elements of devices 45 and 54 and through the gate element of the device 46 to the point A. However, the auxiliary flip-flop remains in the ON state to continue to direct current from the $W_c$ lead to the V lead. The information to be stored is then transferred to the selected memory cell from the key and data modules of the M register in a manner which will be described further hereinbelow. Once the busy flip-flop in a particular control module has been turned on, subsequent prepare-to-write signals on the $W_p$ lead pass through the gate element of the device 47 and the control element of the device 49 to render the device 49 resistive. This turns off the auxiliary flip-flop so that the subsequent write command signals applied to the $W_c$ lead are blocked by the resistive gate element of the device 51 and pass through the gate element of the device 50 to control modules of succeeding memory cells.

During the readout process, currents are received on either the Q or $\overline{Q}$ leads from the key module as a result of the comparison between the information present in the M register key module and that stored in the individual key module of the memory cell under consideration. Current on the Q lead indicates that a true comparison exists, whereas the absence of a true comparison causes the current to be applied on the $\overline{Q}$ lead. In accordance with the present invention, the circuitry associated with the $K_1$ and $K_2$ leads in the control module of FIG. 9 is included to provide for the sequential readout of desired information corresponding to a particular non-unique key which is placed in the M register. It will be assumed that the circuit of FIG. 9 is part of the first memory cell to be read out in response to a particular non-unique identification key. It should be understood that this information is only of interest if the associated busy flip-flop is in the ON condition when the comparison is made.

During the readout process a signal is applied to the $R_c$ lead. As a result of the comparison and continuing after the key information signals are terminated, current on the Q lead from the key module flows toward the point B. A first path from the point B to the point C through the gate element of the device 55 is blocked by virtue of the current applied on the $R_c$ lead through the control element of the device 55 which renders the gate element resistive. A second current path from the point B to point C through the gate element of the device 54 is blocked by virtue of the fact that the associated busy flip-flop is in the ON condition and current is flowing through the control element of the device 54 and rendering the associated gate element resistive. During the readout process the lead designated $\overline{R}_c$ is not energized; thus current from the point B passes through the gate element of the device 57, through the gate element of the device 53 and along the Q lead at the bottom of FIG. 7 through the control element of the device 71 to the gate element of the device 82. At this time the $K_2$ lead is not energized so that the current on the Q lead passes through the gate element of the device 82 to become the read current for the data module. This current passes through the data module and back on the R lead through devices 81, 75 and 74 to ground. Current on the Q lead drives the device 71 resistive so that a signal on the $K_1$ lead, supplied during the readout process, is blocked by the device 71 and is directed through the gate element of the device 72 and the control element of the device 76 to the $\overline{K}_1$ lead. Thus current on the $\overline{R}$ lead is blocked by the gate element of the device 76 being resistive thereby causing current to flow through the data module as a read current.

In all memory cell control modules farther from the M register than the first module with a true comparison signal on the Q lead, the current on the $\overline{K}_1$ lead passes through the control element of the device 75 thus rendering the gate element of that device 75 resistive and blocking current on the R lead thereof, at the same time permitting current to flow on the $\overline{R}$ lead through the gate element of the device 76 to ground. In those memory cells preceding the first cell where a true comparison signal is present on the Q lead, current on the $K_1$ lead passes through the control element of the device 74 thus rendering the gate element thereof resistive and similarly blocking the read current on the R lead. In consequence, one and only one memory cell, namely the particular memory cell nearest the M register which experiences a true comparison with the identification key, is read out to the M register.

Following the signal on the $K_1$ lead and while the $R_c$ lead is still energized, a signal on the $K_2$ lead is applied to block the current on the Q lead of the particular control module corresponding to the memory cell which has just been read out. This signal is blocked by the resistive condition of the gate element of the device 81 and therefore passes through the control element of the device 82 and the gate element on the device 80. In all other control modules the current on the $K_2$ lead is blocked by the gate element of the device 80, but is permitted to pass through the gate element of the device 81. In the cell being read out the device 82 blocks the current on the Q lead so that the current is directed to the $\overline{Q}$ lead through bypass paths in the key module. This current passes through the control element of the device 72, rendering the associated gate element resistive so that a succeeding current pulse on the $K_1$ lead is blocked by the device 72 and directed upwardly through the gate element of the device 71 and the control element of the device 74. Consequently current is switched from the R lead to the $\overline{R}$ lead by the resistive state of the device 74 so that thereafter a repetitive readout of the information in this particular memory cell is avoided. The current on the $K_1$ lead now proceeds to the next succeeding memory cell providing a true comparison signal on its Q lead and the information stored therein is read out in a similar fashion. Thus the $K_1$ and $K_2$ signals applied in succession pass through the memory block, causing the sequential readout of that stored information which has provided a true comparison with the non-unique identification key stored in the M register key module.

While this readout process is proceeding, the current on the $\overline{K}_1$ lead passes through the control element of the device 84 thus blocking current from the associated output lead. However, when the sequential readout process is terminated, current on the $\overline{K}_1$ lead ceases and the current on the $K_1$ lead passes through all of the memory block control modules to the control element of the device 86, thus switching the gate element thereof resistive while at the same time permitting the gate element of the device 84 to become superconductive. As a result current from the I lead is directed to the output lead connected to the gate element of the device 84 and serves as an end-of-readout signal for the M register.

In the described information storage system, a previously occupied memory cell is cleared simply by turning off the associated busy flip-flop. One or a number of the memory cells may be cleared in this fashion by employing an identification key in the M register to select the appropriate memory cells in the manner described. The selected memory cells thereupon develop current on the Q lead from the key module which passes through the control element of the device 56 to the point B and thence to point C through the gate element of the device 55. During the clearing process a current is applied to $\overline{R}_c$ lead which renders the device 57 resistive and thus precludes any possibility of readout at this time. In those memory cells where a true comparison signal is present, a clear command signal on the $C_c$ lead finds the device 56 resistive so that the clear command signal is directed through the control element of the device 46 and the gate element of the device 58. Thus the device 46 is switched resistive, blocking current in the ON path of the busy flip-flop and turning the busy flip-flop off. Any number of busy flip-flops may be turned off in this manner by the clear command current on the $C_c$ lead flowing through all of the control modules in series. It may be noted that whenever a busy flip-flop is off, current through the control lead of device 53 renders the gate element thereof resistive. Since this gate element is in series with the Q lead from the key module, the device 53 precludes any possibility of a readout from a memory cell which has its busy flip-flop turned off. Thus the possibility of spurious readout signals is eliminated.

Referring now to FIG. 10, there is illustrated a key module stage arranged to provide a comparison for a single bit of information. The vertical leads L, W and K originate in the M register and feed similarly located key module stages in each memory cell. The L and K leads carry interrogating signals while the W lead carries an information signal for writing. The V lead is connected to all bit stages of the same key module and is adapted to receive the write command signal from the $W_c$ lead via the associated control module as described in connection with FIG. 9. Both the Q and $\overline{Q}$ leads are sequentially connected to each bit stage comprising the particular key module. The Q, $\overline{Q}$ and V leads of the highest order bit stage are connected to the input of the associated control module as illustrated in FIG. 9. The comparison stage of the key module is basically an equivalence circuit comprising devices 60, 61 and a gated persistor circuit including the devices 59, 62. The persistor circuit stores information as applied on the W lead in the manner described in connection with FIG. 4(*a*). Thus, it may be assumed that current moving upwardly along the W lead represents a binary 1 and causes a corresponding circulating current in the persistor in a counterclockwise direction. Conversely current moving downwardly along the W lead represents a binary 0 and produces a circulating current in the persistor in a clockwise direction.

Assuming that the particular key module stage depicted in FIG. 10 is to receive a bit of information to be stored, the corresponding binary digit is applied to the W lead while current is directed along the V lead from the write command signal in the control module. Current on the V lead drives the device 62 resistive, thereby erasing any information which may have been previously stored in the particular persistor circuit and permitting the write signal to store the desired binary digit therein. The write command signal on the V lead is removed prior to the termination of the write signal on the W lead so that the persistor remains with the binary digit stored therein. The absolute value of the informational current on the W lead is chosen to produce a circulating current in the persistor of approximately two-thirds the critical control current value necessary to switch the gate element of the particular superconductive device from a superconductive to a resistive state. Since this circulating current is less than the current value needed to switch a given device, there is no switching effect on either of devices 60 or 61 as a result of the persistor circulating current alone.

Although particular information is also written into the persistor circuit of the key module, this information is useful only for the purpose of comparing with identification key information from the M register as in the readout process. The comparing operation is accomplished by applying key pulses on the L and K leads from the M register. The individual current levels are so chosen that each L and K lead carries a current equal to two-thirds the critical control current value necessary to switch a particular superconductive element device. The direction of the current signals on the L and K leads determines the value of the transmitted information bit. In this example, a binary 1 may be represented by current directed upwardly along the L and K leads while a binary 0 may be represented by current in the opposite direction. Assuming that the circulating current stored in the particular persistor circuit of FIG. 10 represents a binary 1, this current circulates in a counterclockwise direction. Thus, the currents in the respective control elements of the device 60 are in opposite directions so that the gate element thereof is rendered superconductive. Conversely the currents in the control elements of the device 61 are in the same direction and thereby additive, so that the gate element of the device 61 is rendered resistive. As a result current flowing from the Q lead on the right-hand side of the figure passes through the gate element of the device 60 and continues as a true comparison signal on the Q lead to the left of the figure. Clearly, if the stored circulating current were in the opposite direction, the device 60 would be rendered resistive while the device 61 became superconductive so that the output signal would be a false comparison current applied to the $\overline{Q}$ lead.

FIG. 11 depicts schematically a single bit stage from the data module of a particular memory cell. The element 64 is part of a persistor circuit as shown in FIG. 4(*b*) and is connected to the W lead for the storage of a bit of information therein. The resistance of the device 64 is controlled by current on the V lead which cooperates with a current pulse on the W lead to establish a particular circulating current in the manner described in connection with the gated persistor circuit of FIG. 4. In addition, a dual control superconductive device 63 is shown having a gate element in series with the L lead and having control elements in the persistor circuit and in the R lead respectively. As has already been discussed in connection with FIG. 9, only the R lead of the particular data module to be read out has current applied to it. This read current is selected to be approximately two-thirds the critical value required to switch a superconductor device. An interrogating pulse on the L lead is therefore blocked by the gate element of the device 63 when the persistor current and read currents are additive as in the case of a binary 1. The resulting voltage drop is recognized in the M register as a binary 1, and readout is accomplished without destroying the stored information. If the stored value were a binary 0, the currents in the respective control elements of the device 63 would be subtractive so that the device 63 would remain superconductive and there would be no voltage drop in response to the interrogating pulse on the L lead.

The interrelationship of the various component circuits which have been described separately above may best be seen by considering FIG. 12 which shows a plurality of control, key and data modules arranged as part of a larger memory storage system. In FIG. 12 consistent numerical designations have been maintained similar to those shown in FIGS. 9, 10 and 11. Therefore, the operation of the circuit of FIG. 12 may readily be traced out by following the descriptions of the individual portions of the circuit set forth above in conjunction with FIGS. 9–11. For purposes of illustration, the key module of each cell in FIG. 12 is shown having two bit stages. Similarly the data modules of each cell are shown to contain two individual bit stages. The superconductive device 75, which may be noted as missing from the sequential readout control circuit of cell 1, is required only in those cells following the first cell. This follows from the fact that the $\overline{K}_1$ lead does not pass through the first cell, but originates therein. It will be clear to those skilled in art that the information storage system of FIG. 12 may be extended as desired by adding component circuits of the types described in order to provide an information storage system of desired capacity.

FIG. 13 is a diagrammatic illustration of an arrangement for maintaining the circuits of the present invention at a suitable low temperature near absolute zero. In FIG. 13 there is shown an exterior insulated container 131 which is adapted to hold a coolant such as liquid nitrogen. Within the container 131 an inner insulated container 132 is suspended for holding a coolant, such as liquid helium, which maintains the circuits of the invention at the proper operating temperature. The top of the container 132 may be sealed by a sleeve 133 and lid 134 through which a conduit 135 connects the inner chamber 132 with a vacuum pump 136 via a pressure regulation valve 137. The pump 136 functions to lower the atmospheric pressure within the chamber so as to control the temperature of the helium. The pressure regulation valve 137 functions to regulate the pressure within the chamber so that the temperature is held constant. One or more circuits of the invention, represented by the block 138, may be suspended in the liquid helium at the proper operating temperature in which the circuit components are superconducting. Connection to the circuits 138 may be made by the lead-in wires 139, which also may be constructed of a superconductive material to minimize resistance. The lead-in wires 139 are shown extending through the lid 134 to the set of terminals 140.

The detailed description of the invention thus far has been in connection with a memory system including separate key and data storage modules such as the system disclosed in the above referred to copending application entitled, "Self-Searching Memory." A second particular arrangement in accordance with the invention will now be described comprising a memory system utilizing combined storage modules such as the memory system described in my copending patent application entitled, "Improvements in Self-Searching Memory Systems," also referred to above. This arrangement is represented in block diagram form in FIG. 14 which shows a memory block 115 containing a plurality of individual memory cells 116 each of which comprises a control module 117 and a memory module 118. The similarity between the block diagram of FIG. 14 and that of FIG. 1 will be noted. The apparent difference between the two systems resides in the fact that the system of FIG. 14 has the storage portion of each cell represented as a single section designated a memory module rather than being divided into key and data modules as in FIG. 1. The system of FIG. 14 also has an M register 111 which, like the memory block 115, is divided into two portions, a control module 112 and a memory module 114.

FIG. 15 is a combination schematic and block diagram of an individual memory cell of the particular memory system of FIG. 14 showing the sequential retrieval control of the memory module in accordance with the present invention. In the circuit represented by FIG. 15, current is caused to flow continuously from a current source labeled I in the control module of the M register. Control signals are also generated upon the leads designated $W_p$, $\overline{W}_p$, $W_2$, $C_c$, $K_1$ and $K_2$ in order to control the operation of the memory modules of the memory block to permit the storage, comparison, readout and clearance of information.

Referring to FIG. 15, current from the source I in the control module enters the memory cell at a junction point J which extends into two parallel paths, the V and $\overline{V}$ leads, which join again at a common connection D. Two other parallel paths, the leads R and $\overline{R}$, extend from the connection D to a further common connection L. From the connection L, parallel paths labeled S and $\overline{S}$ extend to a common connection M, and finally from the common connection M, there are two parallel paths leading to the common connection K from whence current may flow over the I lead to the next memory cell. The parallel paths extending between the connections designated M and K comprise the busy flip-flop of the depicted memory cell. This flip-flop is employed to indicate the storage state of the memory module of the associated memory cell. Current in the ON lead indicates that the associated memory module contains stored information whereas current in the OFF lead indicates that the memory module is available for the storage of information. In the operation of the control circuit of the memory cell of FIG. 15 it will be understood that current flows over only one of each pair of parallel paths at a time. Furthermore in preparation for considering the sequence of operations in the complete control cycle, it should be borne in mind that a reset signal on the $W_3$ lead will have occurred in a previous cycle in order to drive the devices 165 and 168 to the resistive state. During the reset signal, current is thus blocked from the V lead connected to the device 168 and from the $\overline{S}$ lead connected to the device 165.

In considering the sequence of operations of the circuit of FIG. 15, it may be borne in mind that the corresponding pairs of leads, V and $\overline{V}$, S and $\overline{S}$, and R and $\overline{R}$, are separately concerned with the steps of writing, selecting and reading information in appropriate memory cells. Thus only one pair of leads need be considered for a given control operation.

To provide for writing information from the memory module of the M register to the memory module of the first available memory cell, a prepare-to-write signal is applied to the $W_p$ lead. Assuming that the memory cell of FIG. 15 is the first available memory cell, its busy flip-flop is in the OFF condition as evidenced by current on the OFF lead between the points M and K. The current on the $W_p$ lead is thus blocked by the device 150 and directed through the control element of the device 152 and the device 154 to the $\overline{W}_p$ lead which is simply the return path for $W_p$ signals. The device 152 is thus rendered resistive so that current from the I lead is directed along the V lead and drives the device 156 resistive. This current on the V lead is utilized in the memory module stages to write information therein from the memory module portion of the M register in a manner which will be further explained in the description of FIG. 16. Following the $W_p$ signal, a pulse is applied to the $W_2$ lead which takes one of two paths depending upon the respective conditions of the devices 156 and 158. With current on the V lead, the device 156 is resistive and so the $W_2$ signal is driven through the path comprising the device 158 and the control element of the device 157. This drives the device 157 resistive, thus switching the current in the busy flip-flop from the OFF lead to the ON lead in order to signify to subsequent writing signals that the associated memory cell is occupied. Following the signal on the $W_2$ lead, a reset signal is applied on the $W_3$ lead which, as already explained, drives the devices 165 and 168 resistive to block current from the V and $\overline{S}$ leads. The memory block is thus ready for the next control operation.

When stored information is to be read out of the memory, steps must first be taken to select the particular memory cells which are to be read out. In accordance with the invention, the memory cells are arranged so that one or a number of cells may be read out in response to an applied identification key which may be unique or non-unique. The key is applied to all of the memory cells in the memory block simultaneously and if more than one memory cell contains the information corresponding to the applied identification key, the selected cells are read out in sequence beginning with those nearest the M register.

Before proceeding with the description of the selection and readout processes, it will be well to describe the details of operation of the individual storage circuits comprising the memory module portions of the respective cells. One such storage circuit is shown schematically in FIG. 16 wherein the device 180 and the parallel lead 181 comprise a gated persistor loop as shown in FIG. 4(*b*). The control elements of devices 182 and 184 are included in this loop for purposes of selection and readout, the operation of which will be described in detail below. When information is to be written into this stage, current is applied upon the V lead, thus driving the device 180 resistive. Signals representative of information to be stored are then applied upon the W lead. These signals may be assumed to be current in the upward direction for the storage of binary 1 and in the downward direction for the storage of a binary 0. As a result, in those stages encountering a current on the V lead, the writing process establishes a counterclockwise current in the persistor loop for a binary 1 and a clockwise current for a binary 0. It may be remembered that the current on the V lead is terminated prior to the termination of the writing signals on the W lead.

This stored current is arranged to be of a magnitude which is approximately two-thirds the critical current value of the devices 182 and 184. Thus these devices are normally maintained in the superconductive condition, even though current may be flowing in the persistor loop. When particular cells are to be selected for information readout, an identification key is applied in the form of signals on the W lead. These signals are the same polarity as those which are used in the writing process. If a binary 1 signal on the W lead encounters a persistor having a binary 1, or counterclockwise, circulating current stored therein, the current on the W lead flows through the branch 181, in effect canceling the current in the loop portion of the persistor. If, however, a mismatch is encountered, the current in the loop portion of the persistor is increased to the critical value of current for the superconductive device 182, driving it resistive, and thereby effectively shifting current from the S lead to the $\overline{S}$ lead. Only those stages having current flowing on the S lead are read out by the sequential readout control circuit of the invention.

After passing along the S or $\overline{S}$ leads, the current returns on one of the parallel R and $\overline{R}$ leads. The superconductive device 184 is shown having two control elements so that current on both elements in the same direction is required in order to drive the device 184 to the resistive state. Current on the R lead flows in only one direction, from left to right. A counterclockwise current in the persistor, corresponding to a stored binary 1, flows through the control element of the device 184 in the same direction as the current on the R lead, thus reinforcing the resultant magnetic field so that the device 184 is rendered resistive. As a result an interrogation pulse on the L lead experiences a voltage drop across the device 184 to provide an indication of a stored binary 1. On the other hand, if the stored circulating current is in a clockwise direction, corresponding to a binary 0, the magnetic fields at the device 184 oppose each other so that the device 184 remains in the superconductive condition. A readout signal on the L lead then detects no voltage drop and so indicates a stored binary 0. If current flows along the $\overline{R}$ lead instead of the R lead, there is similarly no output indication in response to interrogation pulses on the L lead. While this is the same as for a stored binary 0 condition, it means simply that the information stored in such a stage does not interfere with the readout of information in corresponding stages of the particular memory cell which is being read out.

Returning now to the control circuit of FIG. 15, the sequential readout control portion of the invention may be better understood from the previous description of the basic storage circuit of FIG. 16. It will be understood that current flows on the S leads of only those memory cells which are selected from readout as the result of a match with the particular identification key stored in the memory module of the M register. The readout of information from these selected cells is controlled in accordance with the invention by causing the sequential switching of current from the $\overline{R}$ to the R lead of the selected cells. This is done by first applying a pulse to the $K_1$ lead from the control module of the M register. Assuming that the memory cell of FIG. 15 is the first memory cell of those selected for readout, the signal applied on the $K_1$ lead is blocked by the device 170, which has been rendered resistive by current on the S lead. Thus the $K_1$ signal is directed through the control element of the device 172 and the device 171 to the $\overline{K}_1$ lead which is the return path for this signal.

In all other memory cells of the memory block, the signal from the $K_1$ lead will pass through the control element of either the device 174 or the device 175, either of which, driven resistive, block current from the R lead in order to prevent the readout of information from that memory cell at this time. Only in the particular memory cell in which the current passes from the $K_1$ to the $\overline{K}_1$ lead through the device 172 is current blocked from the $\overline{R}$ lead and permitted to flow along the R lead. Thus only the associated memory module of this memory cell provides any output signals in response to the interrogation pulses on the L leads (see FIG. 16).

Following the signal on the $K_1$ lead, a pulse is applied to the $K_2$ lead which has two parallel paths in each memory cell. One path is connected through the device 177 whereas the other path includes the control element of the device 178 and the gate element of the device 179. Because only the memory cell which has been read out has current on the associated R lead, the signal on the $K_2$ lead flows directly through the control modules of the memory block until that particular memory cell is encountered. In that cell the device 177 is rendered resistive so that the $K_2$ signal is directed through the alternate path of the devices 178 and 179. This signal renders the device 178 resistive so that current is switched from the S lead to the $\overline{S}$ lead in this particular cell. As a result the device 171 is driven resistive so that a subsequent signal on the $K_1$ lead passes directly through the devices 170 and 174 to the next selected memory cell where the same sequence of operation is repeated. The $K_1$ signal drives the device 174 resistive, thus shifting current in this cell from the R to the $\overline{R}$ lead. In this manner the readout of information from selected cells presenting a match between stored information and the applied identification key is carried out in sequence until all of the selected cells are read out and an end-of-readout signal is generated as described in connection with FIG. 9.

As in the circuit of FIG. 9, the circuit of FIG. 15 provides for the clearing of information from a particular memory cell by the simple expedient of changing the state of the busy flip-flop from ON to OFF. Clearing of information from one or more memory cells is accomplished by the concurrent application of a signal to the $C_c$ lead while identification key signals are applied to the memory block from the memory module of the M register. The application of the identification key signals causes current to flow on the S leads of those cells selected by the identification key. As a result the device 162 of such a cell is driven resistive so that the $C_c$ signal is directed along the alternate path through the device 164 and the control element of the device 160. This drives the device 160 resistive and switches the current in the busy flip-flop from the ON path to the OFF path. On the other hand, in those cells having current flowing on the $\overline{S}$ lead, the device 164 is resistive and prevents the clear command ($C_c$) signal from turning off the associated busy flip-flop. The device 166 is connected in series with the S lead to prevent current therein in cells in which the busy flip-flop is off. Without this arrangement, an inadvertent selection of a cell previously cleared but still containing obsolete stored information might occur.

By means of the invention, electrical circuits are provided of relatively small size which are capable of producing an instantaneous voltage or plurality thereof representing the storage of particular information. In accordance with the invention, this information may be seqentially read out of a memory in response to an applied identification key. Because of the small size and low power requirements of the circuits employed in the described arrangements, a large number of the individual circuits may be grouped together to provide a memory system of extremely high capacity and high density for processing information in the system. So long as the circuits of the invention are maintained at the proper temperature, information may be stored substantially indefinitely and read out repeatedly without requiring a regeneration of the information and without dissipation of electrical power. In addition, due to the simplicity of construction of the circuits of the invention, a high reliability may be achieved.

Although exemplary embodiments of the invention have been illustrated and described hereinabove, it will be understood that the invention is not limited thereto. Accordingly, the accompanying claims are intended to include all equivalent arrangements falling within the scope of the invention.

What is claimed is:

1. A superconductive control circuit for an information storage system comprising a plurality of information storage devices arranged by groups, means for storing information in selected groups of said devices, means for generating a comparison signal in those groups of storage devices containing information corresponding to a particular identification key, means for applying said signal to corresponding information storage devices in a particular sequence including a plurality of superconductive devices arranged to direct a comparison signal to the corresponding information storage devices only if the stored information of the preceding storage devices in said sequence has been read out, means for diverting said comparison signal from the corresponding storage devices following the readout of information therefrom, and a pair of superconductive devices interconnected to provide a readout termination signal following the completion of the readout sequence.

2. A self-searching memory system comprising a plurality of individual information storage devices arranged in cells, means for selecting particular cells which are available for the storage of information, means for storing information in said selected cells, means for applying a non-unique identification key to all of said cells to develop comparison signals in those cells containing information corresponding to the applied key, sequence control means for selectively applying the comparison signals to the corresponding cell information storage devices in a predetermined sequence, means for diverting the comparison signals from the corresponding cells except when said sequence calls for the readout of information from a particular cell, signal control means for shifting the signal applying condition of said devices from cell to cell throughout the sequence of cells providing comparison signals, and superconductive means for providing a signal upon the completion of the readout sequence.

3. An information storage system comprising a plurality of superconductive information storage devices arranged in cells, means for storing information in those storage devices of a selected cell, comparison means associated with certain of such storage devices in each cell for developing a true comparison signal in those cells containing information corresponding to an applied identification key, means for directing readout current to the storage devices in those cells providing comparison signals in a particular sequence including means for diverting said current to a readout bypass lead for those cells following the cell being read out in said sequence, means for applying the readout current along the readout lead of the information storage devices of the first cell in sequence developing a true comparison signal, means for shunting the true comparison signal to a false comparison lead of the particular cell being read out, and means for providing an output signal upon the termination of the readout sequence.

4. A memory readout control circuit for determining the sequence of readout of a plurality of memory cells bearing information corresponding to an applied identification key comprising a plurality of individual control circuits each associated with a corresponding cell, each circuit containing a true comparison and a false comparison lead, means for applying current alternatively to said leads, means for applying a readout current to the first cell of a predetermined sequence of cells having true comparison output signals and for diverting said readout current from the remainder of those cells in said sequence, means for diverting the true comparison signal to the false comparison lead upon the readout of the particular cell, and means for applying the readout current to the next cell in said sequence upon the diversion of the true comparison signal to the false comparison lead in the preceding cell control circuit.

5. A memory readout control circuit in accordance with claim 4 wherein each of said cells comprises separate superconductive devices for information storage and for comparison with the applied identification key.

6. A readout sequence control circuit for an information storage system comprising a plurality of superconductive devices, true comparison and false comparison leads connected in parallel, means for applying current to said leads on an alternative basis, a first one of said superconductive devices controlled by current on the true comparison lead, a second of said superconductive devices controlled by current on said false comparison lead, a readout lead for supplying a readout current to an associated information storage cell, a third one of said superconductive devices for diverting current from said readout lead upon the presence of current on said false comparison lead, means for transferring the current from the true comparison lead to the false comparison lead at a predetermined time interval after the application of current on said readout lead, and a control signal source for sequentially driving said superconductive devices.

References Cited by the Examiner

UNITED STATES PATENTS

| | | | |
|---|---|---|---|
| 3,021,440 | 2/62 | Anderson | 340—173.1 |
| 3,031,650 | 4/62 | Koerner | 340—173 X |

OTHER REFERENCES

IBM Technical Disclosure Bulletin, volume 3, No. 10, Associative Memory, R. F. Rosin, March 1961, pages 120—122.

IBM Journal, A Magnetic Associative Memory, Kiseda et al., April 1961, pages 106–121.

IRVING L. SRAGOW, *Primary Examiner.*